United States Patent [19]

Brichard

[11] 4,421,669
[45] Dec. 20, 1983

[54] PROCESS FOR THE STABILIZATION OF PARTICLES CONTAINING PEROXYGEN COMPOUNDS AND BLEACHING COMPOSITIONS CONTAINING PARTICLES STABILIZED ACCORDING TO THIS PROCESS

[75] Inventor: Jean Brichard, Vilvoorde, Belgium

[73] Assignee: Interox (Société Anonyme), Brussels, Belgium

[21] Appl. No.: 216,073

[22] Filed: Dec. 12, 1980

[30] Foreign Application Priority Data

Dec. 12, 1979 [FR] France ............................ 79 30664

[51] Int. Cl.³ .................. C01B 15/10; C11D 3/39; C11D 7/18; C11D 7/54
[52] U.S. Cl. ................... 252/186.25; 252/95; 427/213
[58] Field of Search ............... 252/186, 186.25, 95; 427/213

[56] References Cited

U.S. PATENT DOCUMENTS

| | | | |
|---|---|---|---|
| 3,159,581 | 12/1964 | Diehl | 252/152 |
| 3,847,830 | 11/1974 | Williams et al. | 252/186 |
| 3,908,045 | 9/1975 | Alterman et al. | 427/213 |
| 3,917,663 | 11/1975 | Kegelart et al. | 423/415 P |
| 4,078,099 | 3/1978 | Mazzola | 427/213 |
| 4,126,573 | 11/1978 | Johnston | 427/213 |
| 4,131,562 | 12/1978 | Lutz et al. | 252/186 |

FOREIGN PATENT DOCUMENTS

| | | |
|---|---|---|
| 2123476 | 9/1972 | France . |
| 2293241 | 7/1976 | France . |
| 1300855 | 12/1972 | United Kingdom . |
| 1387167 | 3/1975 | United Kingdom . |

Primary Examiner—Allan Lieberman
Attorney, Agent, or Firm—Spencer & Frank

[57] ABSTRACT

Process for the stabilization of particles containing peroxygen compounds and bleaching compositions containing particles stabilized according to this process. The particles containing peroxygen compounds are kept in a fluidized bed. A coating agent which is insoluble in water and melts at low temperatures is introduced in the form of solid particles into the fluidized bed. The fluidized bed is kept at a temperature at least equal to the melting point of the coating agent.

6 Claims, 2 Drawing Figures

PROCESS FOR THE STABILIZATION OF PARTICLES CONTAINING PEROXYGEN COMPOUNDS AND BLEACHING COMPOSITIONS CONTAINING PARTICLES STABILIZED ACCORDING TO THIS PROCESS

BACKGROUND OF THE INVENTION

The present invention relates to a process for the stabilisation of particles containing peroxygen compounds by coating using coating agents that are insoluble in water and melt at low temperatures such as waxes and bleaching compositions containing particles stabilised according to this process.

It is well-known to use certain peroxygen compounds in the form of particles as bleaching agents in detergent powder mixtures. In conventional household detergent compositions, particles of sodium perborate tetrahydrate are habitually tested as a bleaching compound because they are relatively stable towards decomposition in a detergent powder medium. It is becoming increasingly common, however, to use cold methods of washing and soaking clothes for which sodium perborate has the disadvantage of dissolving too slowly. In order to overcome this disadvantage, it has been suggested that particles of other inorganic peroxygen compounds be introduced into detergent powders notably alkali metal percarbonates, perphosphates and peroxymonosulphates, which have suitable rates of dissolution at low temperatures. These peroxygen compounds and particularly the percarbonates decompose too rapidly in the powder state, particularly when they are stored in a moist atmosphere. Moreover, the other constituents of detergent compositions often initiate this decomposition.

Numerous processes have been put forward to overcome these disadvantages and to improve the stability of particles of peroxygen compounds such as percarbonates. It was thus suggested in U.S. Pat. No. 3,847,830 filed on Jan. 17, 1972 and assigned to Laporte Industries Limited that they be coated with coating agents that are insoluble in water and melt at low temperatures, based on fatty acids alkanolamides of fatty acids, glycerol esters of fatty acids, long-chain alcohols or paraffin waxes. The methods used to effect coating are complicated because of the fact that the coating agent is insoluble in water. They require the dissolution of the coating agent in an organic solvent or its use in the melted form. This first technique involves the elimination of great amounts of solvent which render the process complex, while in the second, the quantities of coating agent required to achieve sufficient stability of the particles of peroxygen compounds are relatively large, the effect of which is to reduce the active oxygen content of the stabilised particles obtained and to reduce unduly the rate of dissolution in water of the peroxygen compound.

SUMMARY OF THE PRESENT INVENTION

The purpose of the present invention is to overcome the disadvantages of this known process. Moreover, the process according to the invention is particularly simple to carry out and requires only a low consumption of energy. It does not require the use of any solvent and gives rise to few product losses. The stabilised particles obtained according to the invention have a perfectly satisfactory rate of dissolution in water and good resistance to abrasion and caking. Moreover, their active content is close to the theoretical content because their coating agent content is very low in relative terms.

To this end, the present invention relates to a process for the stabilisation of particles containing peroxygen compounds by coating using coating agents that are insoluble in water and melt at low temperatures, according to which the particles containing peroxygen compounds are kept in a fluidised bed and according to which the coating agent is introduced into the fluidised bed in the form of solid particles and the fluidised bed is kept at a temperature at least equal to the temperature at which the coating agent begins to melt.

Preferably, a coating agent is chosen whose initial melting point is lower than the melting point and the decomposition temperature of the peroxygen compound. Coating agents whose initial melting point is higher than the ambient temperature and preferably greater than 30° C. are generally suitable.

More often, coating agents are chosen which have an initial melting point lower than 90° C., and, preferably lower than 80° C.

Good results were obtained when the coating agent has an initial melting point of between 40° and 90° C. The best results were obtained with coating agents whose initial melting point is between 50° and 80° C.

DETAILED DESCRIPTION OF THE INVENTION

Figure 1:
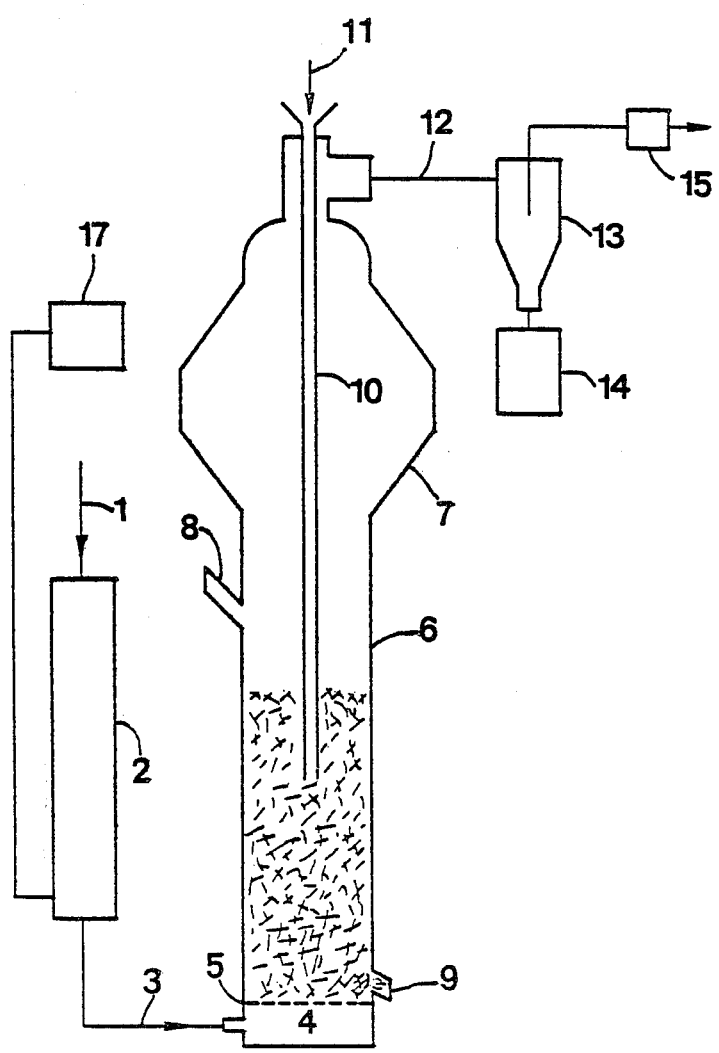

The coating agent that can be used according to the invention can be of various types and can be made up of mixtures of several compounds. Organic compounds compatible with the peroxygen compound are generally chosen. They are characterised by a solubility in water of less than 5% and preferably less than 1% by weight. These coating agents are generally chosen from waxes of all types available commercially. They may possibly contain certain additives such as products capable of lowering their melting point or products capable of improving the stability of particles of the peroxygen compound. These additives are generally present in quantities of less than 10% by weight of the coating agent.

The waxes that can be used according to the invention can be of vegetable, animal, mineral or synthetic origin. They can be based on various types of products such as high molecular weight hydrocarbons, fatty acids and their derivatives such as esters and amides, and fatty alcohols. The best results were obtained with waxes based on high molecular weight hydrocarbons.

The fatty acids present in the waxes that can be used according to the invention are generally natural or synthetic acids containing at least 10 carbon atoms. Waxes containing saturated fatty acids containing at least 10 carbon atoms or unsaturated fatty acids containing at least 18 carbon atoms are generally used. Waxes containing saturated fatty acids containing 10 to 30 carbon atoms are used in preference, the best results being obtained using waxes of saturated fatty acids containing 14 to 25 carbon atoms.

The derivatives of fatty acids present in the waxes that can be used according to the invention can be of various types. Generally speaking, they are esters of fatty acids such as defined above and compounds chosen from monohydric or polyhydric alcohols and epoxides, and amides of fatty acids such as defined above and of substituted or unsubstituted aromatic, aliphatic or alicyclic amines.

The esters of fatty acids present in the waxes that can be used according to the invention are preferably esters of alcohols chosen from long-chain alcohols such as alcohols containing 10 to 30 carbon atoms, glycols, polyethylene glycols, glycerol, pentaerythritol and carbohydrates, or esters of epoxides such as ethylene oxide and propylene oxide.

The amides of fatty acids present in the waxes that can be used according to the invention are preferably amides of mono- or dialkanol amines containing 1 to 20 carbon atoms.

The fatty alcohols present in the waxes that can be used according to the invention are preferably natural or synthetic alcohols containing at least 12 carbon atoms. Generally speaking, these are primary or secondary mono- or polyhydric saturated fatty alcohols. Good results were obtained using saturated fatty alcohols containing 12 to 35 and preferably 14 to 30 carbon atoms.

The high molecular weight hydrocarbons present in the waxes that can be used according to the invention can be natural or synthetic. They can be of various kinds. Thus it is possible to use branched or unbranched aliphatic hydrocarbons, aromatic hydrocarbons and homopolymers and copolymers of olefins, possibly modified by chemical means. It is preferable to use products whose average molecular weight varies between 300 and 800 as aliphatic hydrocarbons and olefin polymers. It is preferable to use naphthenic derivatives as aromatic hydrocarbons. Good results were obtained with microcrystalline waxes, paraffin waxes and short-chain polyethylenes, possibly modified by chemical means. It is thus possible to oxidise them, and if necessary, to give them subsequent treatments such as saponification, esterification or treatments with cyanates.

The particles of coating agents used according to the invention can be of a size generally between 0.05 and 10 mm average diameter and preferably between 0.1 and 5 mm.

The quantity of coating agents used according to the invention is generally between 0.01 and 10% of the weight of peroxygen compound to be stabilised and preferably between 0.1 and 3% of this weight.

The peroxygen compounds contained in the particles to be stabilised according to the invention can be of various types.

Generally speaking, these are organic of inorganic peroxygen compounds that are normally relatively unstable. The invention can thus be applied to particles of solid organic peroxides such as aliphatic, cycloaliphatic and aromatic peroxyacids and the corresponding acyl peroxides. It can be applied notably to the stabilisation of particles of aromatic peroxy acids and corresponding acyl peroxides such as dibenzoyl, phthaloyl and diphthaloyl peroxides, peroxyphthalic acid, substituted peroxybenzoic acids and mono- or poly-, -peroxytrimellitic, -peroxytrimesic, -peroxyhemimellitic, -peroxypyromellitic, -peroxyprehnitic and -peroxymellophanic acids.

The invention can be applied with advantage to the stabilisation of particles of inorganic peroxygen compounds such as alkali metal and alkaline earth metal peroxides and alkali metal persalts which are normally unstable. Of these, the most frequently used are calcium peroxide, magnesium peroxide and alkali metal and more particularly sodium and potassium percarbonates, perpyrophosphates, pertripolyphosphates, persilicates, and peroxymonosulphates. The particles to be stabilised may contain a single peroxygen compound or a mixture of peroxygen compounds.

In particular, the invention can be applied very advantageously to the stabilisation of particles containing sodium percarbonate.

The particles of peroxygen compounds stabilised according to the invention can contain, in addition to the peroxygen compounds, various additives in varying quantities. Of these additives, it is possible to use notably stabilisers such as alkali metal and alkaline earth metal silicates or other additives the nature of which is chosen in terms of the intended use of the peroxygen compound. The additives content depends notably on their nature, the intended use of the peroxygen compound, the nature of the peroxygen compound and the anticipated storage periods. Generally speaking, the quantity of peroxygen compounds present in the particles to be stabilised is at least 20% of the weight of the particles and preferably at least 50%. The incorporation of stabilisers directly into the particles at the same time as the peroxygen compounds is, however, insufficient to ensure satisfactory stability of the particles under their normal condition of use.

The particles of peroxygen compounds to which the present invention can be applied can be prepared in any way known in itself. Thus, when the peroxygen compounds are persalts, they can be produced by fluidised bed processes such as those described in French Pat. Nos. 70.01 315 filed on Jan. 14, 1970 and 71.40860 filed on Nov. 15, 1971 in the name of SOLVAY & CO, or by processes of crystallisation from their aqueous solutions.

The particles of peroxygen compounds used can be of varying sizes. Generally speaking, their average diameter is between 0.01 and 2 mm and preferably between 0.02 and 1 mm.

The temperature of the fluidised bed is chosen in terms of the temperature at which the coating agent used begins to melt. Good results were obtained using a bed temperature of between approximately this initial melting point and this same temperature plus 20° C.

The rate at which the coating agent is introduced into the fluidised bed can vary widely. When operating discontinuously, all the coating agent can be introduced at once. Generally speaking, it is however preferable to introduce the coating agent continuously or in small successive portions in order to prevent clogging of the bed. When operating continuously, the coating agent is introduced continuously or in small successive portions. The flow rate of coating agent is generally between 0.01 and 50 g per minute and per liter of bed. Good results were obtained when this flow rate was between 0.1 and 10 g.min.$^{-1}$.l$^{-1}$ of bed. The flow rate of the peroxygen compound is consequently adjusted when operating continuously in order to obtain the desired coating agent content.

The process according to the invention can be carried out continuously or discontinuously. The fluid bed device used can be cylindrical, cylindroconical, parallelepipedal in shape or any other shape permitting the application of the process. The device can be fitted with various devices such as vertical partitions which make it possible to improve the homogeneity of the mixture of coating agent and particles of peroxygen compound to be coated.

The fluidised bed can be raised to the desired temperature according to various known methods such as heating of the carrier gas and/or heating of a bundle tubes placed in the bed.

The temperature of the air or other carrier gas introduced into the base of the fluidised bed, for example across a cloth or distribution plate can vary widely depending notably on the temperature of the bed to be maintained, the latent heat of melting of the coating agent, the flow rate of the carrier gas and the possible use of other means of heating the fluidised bed.

If the fluid bed is heated using the carrier gas, the temperature of this latter is generally chosen between the temperature of the bed to be maintained and this same temperature plus 50° C. If the coating agent has an initial melting point of between 50° and 80° C., the temperature of the carrier gas is generally between 55° and 120° C.

The carrier gas can be any gas that is inert towards the constituents of the fluid bed. Nitrogen, rare gases or air are habitually used. Air is particularly suitable. The flow rate of the carrier gas can be variable. It is generally between 0.05 and 5 and most often between 0.1 and 3 $m.sec^{-1}$. The best results were obtained with carrier gas flow rates of 0.3 to 2 $m.sec^{-1}$.

The solid particles of coating agent can be introduced into the bed in any known way, for example using a plunger device in the bed. This process of introduction can be carried out by gravity with the aid of a pulser gas.

The feed with particles of peroxygen compounds can also be carried out in any known manner, for example using a Venturi system.

The particles of stabilised peroxygen compounds can be drawn off by means of any known device, e.g. by elutriation through the base of the fluidised bed device or through a lateral pipe, this pipe therefore determining the height of the fluidised bed.

The gases emerging from the fluidised bed are passed to advantage across a fines separator such as, for example, a cyclone. They can then be passed into the atmosphere or possibly recycled to the fluidised bed.

The particles of stabilised peroxygen compounds can then be cooled according to various known methods.

When operating discontinuously, it is thus possible, after the coating stage, to keep the particles in the fluidised bed and to lower the temperature of the fluidisation gas so that the temperature of the bed is lower than the melting point of the coating agent used. When operating continuously, the particles emerging from the fluidised bed are generally passed continuously into a device enabling them to be cooled such as a second fluid bed kept at a temperature lower than the melting point of the coating agent. Fluidised bed cooling of the stabilised particles is generally carried out using a carrier gas kept at ambient temperature or at a temperature near to this. Other known cooling devices can also be used.

Figure 2:
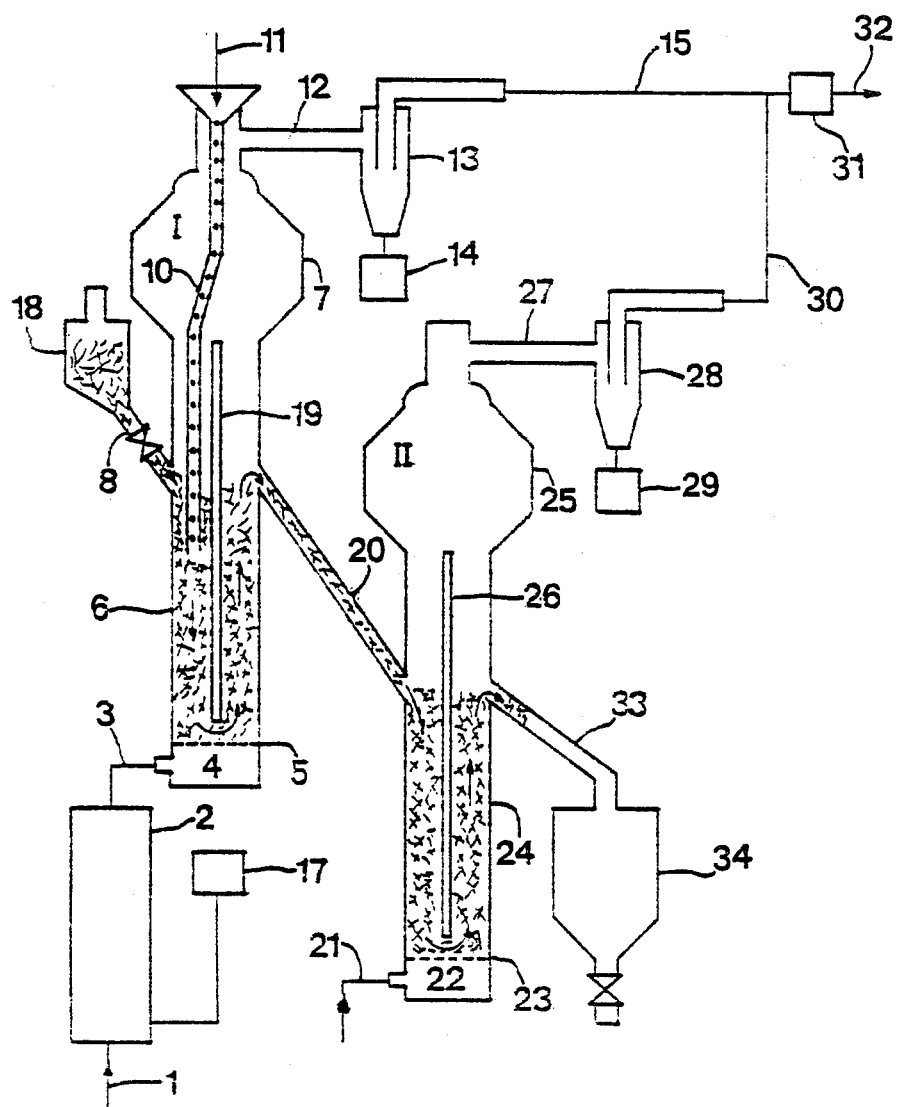

The process according to the invention can be carried out to advantage in devices such as those shown in FIGS. 1 and 2 in the appendix which represent different methods of conducting the process according to the invention.

FIG. 1 represents a discontinuous device having a fluidised bed of particles 6 fluidised by means of a carrier gas such as air which enters the system via line 3 after having been preheated in a preheater 2 fed with air via line 1 and the temperature of which is controlled by means of a regulator 17. The hot air passes into the wind box 4, crosses the grill 5 and enters the fluidised bed 6 above which there is a zone 7 which enables some of the fines to be passed back to the fluidised bed. The device can be emptied by means of a pipe 9. Pipe 8 enables the device to be filled with the particles to be coated.

The particles of coating agent are introduced into the bed through the vertical plunging tube 10 with the aid of funnel 11.

The gases emerging from the fluidised bed pass via line 12 into a fines collector or cyclone 13 and leave the device via ventilator 15. The fines are recovered in 14.

FIG. 2 represents a fluidised bed device capable of operating continuously. The device comprises two fluidised beds. The particles are coated in section I and cooled in section II.

The particles present in the coating fluidised bed 6 are fluidised by means of a carrier gas such as air which enters the system via line 3 after having been preheated in a preheater 2 fed with air via line 1, the temperature of which is controlled by means of a regulator 17. The hot air passes into the wind box 4, crosses grill 5 and enters the fluidised bed 6 above which there is a zone 7 which enables part of the fines to be returned to the fluid bed. The particles to be coated can be introduced into the device be means of pipe 8 which is connected to storage tank 18.

The particles of coating agent are introduced into the bed via plunging tube 10 with the aid of funnel 11. An hermetic median wall is placed in the bed between the area into which the coating agent and the particles to be coated are introduced and the area from which the coated particles are removed in order to ensure homogeneous mixing of the particles of peroxygen compounds and the coating agent and thus even coating and complete use of the wax. This wall thus ensures that the particles follow a set course and that only coated particles are drawn off.

The gases emerging from the fluidised bed pass via line 12 into a fines collector or cyclone 13 and leave the device via line 15 and rejoin ventilator 31.

The coated particles formed in fluidised bed 6 are drawn off continuously via line 20 and passed into the second cooling fluidised bed 24.

The coated particles are fluidised by means of a fresh carrier gas such as air which enters the system via line 21. The fresh air passes into wind box 22, crosses grill 23 and enters fluidised bed 24 above which there is a zone 25 which enables some of the fines to be returned to the fluidised bed. A pipe 33 permits collection of the production which is passed to storage tank 34.

Fluidised bed 24 can also be fitted with a median wall 26 so as to ensure that the particles follow a set course and that only well-cooled particles are drawn off.

The gases emerging from the fluidised bed pass via line 27 into a fines collector or cyclone 28 and leave the device via line 30 and rejoin ventilator 31.

According to a variation not shown in FIG. 2, at least part of the air collected via line 32 can be used to fluidise the particles of bed 6 and can thus be returned to 1 which makes it possible to recover part of the heat used to heat fluidised bed 6.

The size of the particles of peroxygen compounds stabilised according to the invention can vary widely. Generally speaking, the particles are of a size similar to that of the other particles that make up the detergent powders. They usually have a mean diameter of between 0.01 and 2 mm and preferably between 0.02 and 1 mm.

If the particles stabilised according to the invention contain sodium percarbonate, they generally have a free flow apparent specific gravity of between 0.8 and 1.5 kg/dm$^3$ and most often between 0.8 and 1.3 kg/dm$^3$.

Their pourability, expressed as the time taken for a weight of 250 g to flow through the 16 mm in diameter orifice of a short stem analytical funnel does not generally exceed 10 seconds and their index of abrasive wear measured according to the process described in the standard ISO/TC 47/WG 11 (Secretariat—86) 167 of the British Standards Institution is generally less than 10%.

The free flow apparent specific gravity mentioned above is determined by a process similar to those described in A.S.T.M. standards D 392-38 and B 212-48, advocated for measuring the apparent specific gravity of casting powders and metal powders respectively. The apparatus used, however, is slightly different. It comprises a hopper shaped like a truncated cone, the large base of which has a diameter of 53 mm and the small base, fitted with a fully closing obturator, has a diameter of 21 mm, the height between the bases being 58 mm and the effective volume being approx. 60 cm$^3$.

The cylindrical cup with a volume of 50 cm$^3$ has an internal diameter of 37 mm and a height of about 46 mm. The base of the hopper is placed 65 mm above the base of the cup. The method of operating is the same as that described in the A.S.T.M. standards. The obturator of the hopper is closed and the latter is filled with the product to be examined which is levelled off to the upper edge of the hopper using a rectilinear blade. The cup is placed in the shaft of the hopper and the obturator is opened. After the product has flowed down, it is levelled off to the upper edge of the cup. The apparent specific gravity by free flow is equal to the ratio between the weight of substance in the cup expressed in kg and the volume of the cup expressed in dm$^3$.

The pourability of the product is characterised by the time taken for a given quantity of product to flow through the orifice of the stem of a calibrated funnel. The process is very similar to the one described in standard A.S.T.M. D 392-38.

The apparatus comprises a valve funnel made of polished stainless steel of which the angle of the cone is 60°, the internal diameter 180 mm and the lenth of the stem 165 mm. The internal diameter of the stem is 16 mm. The test involves introducing 250 g of this product into the funnel and measuring the flow time after the valve has been opened.

The present invention also relates to bleaching compositions containing particles of peroxygen compounds stabilised by the process described above.

Apart from peroxygen compound(s), such compositions generally also contain one or more surface active agents chosen from cationic, anionic, nonionic or amphoteric surface active agents such as, for example, those quoted in the book "Surface active agents" by A. M. Schwarz and J. W. Perry or in "Encyclopaedia of Surface Active Agents" Volume I, 1961 and volume II, 1964 by I. P. Sisley and P. I. Wood or in U.S. Pat. No. 3,159,581 and one or more detergent auxiliaries known as builders, one of the main functions of which is to sequestrate the metal ions responsible for the hardness of water, such as polyphosphates, carboxylated polymers, sodium nitrilotriacetate, salts of ethylene diamine tetraacetic acid and derivatives of phosphonic acids.

These compositions can also contain other substances chosen in terms of the particular sphere of application of the composition. Examples of these include persalt activators, optical brighteners, foaming inhibitors, enzymes, greying inhibitors and soil antiredeposition agents, disinfectants, corrosion inhibitors, perfumes, dyes, pH regulators, agents capable of liberating active chlorine, etc.

The bleaching compositions generally contain:
0.1 to 90% by weight particles of peroxygen compounds coated according to the invention
0 to 50% by weight of surface active agents
0 to 50% by weight of one or more builders
0 to 20% various additives.

The washing, cleaning, soaking or bleaching processes using such compositions are generally conducted at temperatures of 10° to 130° C. and said compositions are used therein in a quantity of 0.5 to 20 g/l of aqueous liquor.

In order to illustrate the invention yet without limiting its scope, some examples of production of coated particles of sodium percarbonate and some examples illustrating the properties of these particles will be given below. Examples 1 to 6 were carried out according to the invention and examples 7 to 9 were carried out according to another method by way of comparison.

EXAMPLES 1-6

The tests described below were carried out discontinuously in a device of the same type as the one shown in FIG. 1.

The device consists of a cylinder 15 cm in diameter and 77 cm in height, the base of which is fitted with a plate for distributing the gas (1 mm holes).

To begin with, homogenous particles of sodium percarbonate with an apparent specific gravity by free flow of 1.15 to 1.18 kg.dm$^{-3}$ are introduced into this device.

The bed of particles is fluidised by introducing a current of warm air across the gas distribution plate. Particles of wax are introduced by means of a plunger tube inside the bed. After coating, the bed is cooled by keeping it in the fluidised form by means of cool air at ambient temperature.

The height of the fluidised bed is about 40 cm.

The operating conditions are shown in table 1 below. Two types of waxes were tested: wax A which is the VYBAR 103 product sold by BARECO and which is a hydrocarbon polymer derived from ethylene, and wax B which is the VYBAR 253 product, also sold by BARECO.

TABLE 1

| COATING CONDITIONS ACCORDING TO THE INVENTION | | | | | | | |
|---|---|---|---|---|---|---|---|
| | | Test No | | | | | |
| | | 1 | 2 | 3 | 4 | 5 | 6 |
| Sodium percarbonate used | | | | | | | |
| quantity | kg | 3 | 3 | 3 | 3 | 3 | 3 |
| active oxygen content | % by weight | 14.1 | 14.1 | 14.3 | 14.3 | 14.3 | 14.3 |
| mean diameter | mm | 0.32 | 0.32 | 0.40 | 0.40 | 0.40 | 0.40 |
| Wax used | | | | | | | |
| type | | A | A | B | B | A | A |
| temp. at which melting commences | °C. | 72 | 72 | 68 | 68 | 72 | 72 |

TABLE 1-continued

| COATING CONDITIONS ACCORDING TO THE INVENTION | | | | | | | |
|---|---|---|---|---|---|---|---|
| | | Test No | | | | | |
| | | 1 | 2 | 3 | 4 | 5 | 6 |
| total quantity introduced | g | 15 | 60 | 30 | 15 | 30 | 15 |
| flow rate | g.min$^{-1}$ | * | * | 3** | 3** | 3** | 3** |
| mean diameter | mm | 3.2 | 3.2 | 3.2 | 3.2 | 3.2 | 3.2 |
| Coating conditions | | | | | | | |
| fluidisation air | | | | | | | |
| temperature | °C. | 88 | 90 | 95 | 95 | 108 | 110 |
| flow rate | Nm$^3$.h$^{-1}$ | 29 | 29 | 42 | 42 | 43 | 43 |
| temperature of the bed | °C. | 78 | 80 | 78 | 79 | 79 | 81 |
| contact time | min | 20 | 20 | 15 | 10 | 15 | 10 |
| Cooling conditions | | | | | | | |
| fluidisation air | | | | | | | |
| temperature | °C. | 20-25 | 20-25 | 20-25 | 20-25 | 20-25 | 20-25 |
| flow rate | Nm$^3$.h$^{-1}$ | 29 | 30 | 30 | 30 | 30 | 30 |
| final temperature of the bed | °C. | 40 | 40-45 | 40-45 | 40-45 | 40-45 | 40-45 |
| contact time | min | 15 | 15-20 | 15-20 | 15-20 | 20-25 | 20-25 |
| Coated sodium percarbonate | | | | | | | |
| active oxygen content | % by weight | 13.9 | 13.7 | 14.0 | 14.1 | 14.1 | 14.1 |
| coating agent content | % by weight | 0.5 | 2 | 1 | 0.5 | 1 | 0.5 |

*the wax was introduced in one stage
**the wax was introduced in a quantity of 0.75 g every 15 seconds

EXAMPLES 7 TO 9

The tests mentioned above were conducted discontinuously in a device similar to the one used for carrying out tests 1–6. This time, the device does not comprise a plunger tube in the bed; instead there is a sprayer at the base of the bed which permits the continuous introduction of a wax emulsion.

To begin with, homogeneous particles of sodium percarbonate with an apparent specific gravity by free flow of 1.15 to 1.18 kg.dm$^{-3}$ are introduced into the device.

The bed of particles is fluidised by introducing a current of hot air across the gas distribution plate. An aqueous emulsion of wax is introduced by means of an atomiser. After coating, the bed is cooled by keeping it in the fluidised form using cold air at ambient temperature.

The height of the fluidised bed is about 40 cm.

The operating conditions are shown in table 2 below. Three types of waxes were tested: wax C which is the PETROLITE C 7500 product sold by BARECO and which is a low molecular weight ethylene polymer, wax D is the PETROLITE C 1035 product sold by BARECO and which is a petroleum fraction made up of n-paraffinic hydrocarbons, branched paraffinic and naphthenic hydrocarbons and wax KPE produced by HOECHST which is a product of esterification by alcohols of an acid wax obtained by oxidation of bitumen derived from lignite.

TABLE 2

| COATING CONDITIONS OF THE COMPARATIVE TESTS | | | | |
|---|---|---|---|---|
| | | Test No | | |
| | | 7 | 8 | 9 |
| Sodium percarbonate used | | | | |
| quantity | kg | 3 | 3 | 3 |
| active oxygen content | % by weight | 14.4 | 14.4 | 14.4 |
| mean diameter | mm | 0.38 | 0.38 | 0.38 |
| Wax used | | | | |
| type | | C | D | E |
| temp. at which melting commences | °C. | 97.8 | 90 | 76 |
| total quantity introduced | g | 60 | 60 | 60 |
| flow rate of the emulsion | kg.h$^{-1}$ | 0.291 | 0.300 | 0.300 |
| concentration of the emulsion | % by weight | 20 | 20 | 20 |
| Feed of the test atomiser | | | | |
| flow rate | Nm$^3$.h$^{-1}$ | 2 | 2 | 2 |
| temperature | °C. | 20 | 20 | 20 |
| absolute pressure | bar | 2 | 2 | 2 |
| Coating conditions | | | | |
| fluidisation air | | | | |
| temperature | °C. | 100 | 100 | 90 |
| flow rate | Nm$^3$.h$^{-1}$ | 42 | 42 | 39 |
| temperature of the bed | °C. | 63 | 64 | 53 |
| contact time | min | 62 | 60 | 60 |
| Cooling conditions | | | | |
| fluidisation air | | | | |
| temperature | °C. | 20-25 | 20-25 | 20-25 |
| flow rate | Nm$^3$.h$^{-1}$ | 42 | 42 | 39 |
| final temperature of the bed | °C. | 40 | 40 | 40 |
| contact time | min | 20 | 20 | 20 |
| Coated sodium percarbonate | | | | |
| active oxygen content | % by weight | 14.1 | 14.1 | 14.1 |

TABLE 2-continued

COATING CONDITIONS OF THE COMPARATIVE TESTS

| | | Test No | | |
|---|---|---|---|---|
| | | 7 | 8 | 9 |
| coating agent content | % by weight | 2 | 2 | 2 |

EXAMINATION OF THE PRODUCTS

The different particles obtained from examples 1 to 6 known as products 1 to product 6 respectively were compared with the products obtained from examples 7 to 9 respectively known as 7 to 9 respectively.

The results are shown in Table 3 below.

TABLE 3

| Products | active oxygen % by weight | specific gravity kg.dm | pourability secs. | Rate of dissolution at 15° C., % dissolved | |
|---|---|---|---|---|---|
| | | | | 3 min | 15 min |
| Sodium perborate tetrahydrate | 10.4 | 0.9 | 4 | 70 | 100 |
| Non-coated sodium percarbonate | 14.3 | 1.15 | 3 | 95 | 100 |
| Coated sodium percarbonate of example | | | | | |
| 1 | 13.9 | 1.15 | | 76 | 100 |
| 2 | 13.7 | 1.15 | | 87 | 100 |
| 3 | 14.0 | 1.16 | 3.5 | 86 | 100 |
| 4 | 14.1 | 1.14 | | 69 | 100 |
| 5 | 14.1 | 1.17 | 3 | 94 | 100 |
| 6 | 14.1 | 1.15 | | 69 | 100 |
| 7 | 14.1 | 1.14 | 3 | 23 | 75 |
| 8 | 14.1 | 1.14 | 3 | 65 | 100 |
| 9 | 14.1 | 1.15 | 4 | 68 | 100 |

STABILITY OF THE PRODUCTS

The purpose of these tests was to illustrate the stability of the products according to the invention when sotred in the presence of the other constituents of a washing powder without enzymes and to compare it with that of non-coated sodium percarbonate and commercial grade sodium perborate tetrahydrate as well as sodium percarbonate coated according to other methods such as comparative products 7 to 9.

The mixtures used contained 2% by weight active oxygen i.e. 7 g of sodium percarbonate (products 1 to 9 and non-coated sodium percarbonate), i.e. 10 g of sodium perborate tetrahydrate and 42 g of commercial grade powder the composition of which is given in Table 4 below.

TABLE 4

| Composition of the detergent powder without enzymes | |
|---|---|
| Constituents | g/100 g |
| Sodium silicate | 7.5 |
| Magnesium silicate | 1.9 |
| Sodium tripolyphosphate | 43.7 |
| Sodium sulphate | 21.0 |
| Sodium ethylene diamine tetraacetate | 0.3 |
| Carboxymethylcellulose | 1.2 |
| Organic Surface active agents | 14.4 |
| sodium alkylarylsulphonate condensate of ethylene oxide on fatty alcohol soap | |
| Water and others | 10.0 |

After homogenisation, the mixtures were introduced into cardboard boxes (11.5×7×2 cm) coated with microcrystalline wax (permeability 10 g $H_2O/m^2$.day); the boxes thus prepared were then stored at 35° C. in an atmosphere of 80% relative humidity (RH) for four weeks.

Another series of boxes the back and front of which were coated with a film of cellulose acetate (permeability 550 g $H_2O/m^2$.day) were also prepared and stored at 28° C. in an atmosphere of 70% relative humidity (RH) for four weeks.

After each storage period, the active oxygen of the powder was determined by direct titration with $KMnO_4(N/2)$ and the active oxygen loss compared with the initial active oxygen was evaluated.

The results of the storage tests in the presence of the detergent powder are given in table 5 below. They show the remarkable superiority of the invention compared with the non-coated sodium percarbonate particles and compared with the sodium percarbonate particles coated according to another method.

TABLE 5

| Results of the storage tests in boxes in the presence of the detergent powder without enzymes | | |
|---|---|---|
| Particles | 28° C. 70% RH | 35° C. 80% RH |
| | % active oxygen lost after 4 weeks | |
| Non-coated sodium percarbonate | 11 | 26 |
| Coated sodium percarbonate of example | | |
| 1 | 6 | 21 |
| 2 | 3 | 11 |
| 3 | 4 | 8 |
| 4 | 5 | 11 |
| 5 | 5 | 11 |
| 6 | 7 | 13 |
| 7 | 9 | 14 |
| 8 | 10 | 13 |
| 9 | 12 | 24 |

I claim:

1. Process for the stabilisation of particles containing a peroxygen compound by coating using a coating agent that is insoluble in water and melts at low temperature according to which the particles containing the peroxygen compounds are kept in a fluidised bed, comprising introducing the coating agent into a continuously operating fluidised bed in the form of solid particles at a flow rate of from 0.01 to 50 g per minute and per liter of bed and maintaining the fluidised bed at a temperature between the temperature at which the coating agent begins to melt and this same temperature plus 20° C., with the solid particles of the coating agent having a diameter between 0.05 and 10 mm, the amount of coating agent being between 0.01 and 10% by weight of the peroxygen compound, the diameter of the particles containing the peroxygen compound being between 0.01 and 2 mm, the coating agent being a wax having an initial melting point of between 50° and 90° C., and selected from high molecular weight hydrocarbons, fatty acids and their derivatives, fatty alcohols and mixtures of these.

2. Process according to claim 1, wherein the coating agent is chosen from high molecular weight hydrocarbons.

3. Process according to claim 1, where the coating agent is used in the form of particles with a mean diameter between 0.1 and 5 mm.

4. Process according to claim 1, wherein the coating agent is used in a quantity of 0.1 to 3% of the weight of the particles of peroxygen compound.

5. Process according to claim 1, wherein it is applied to the stabilisation of particles containing sodium percarbonate.

6. A bleaching composition which contains particles containing a peroxygen compound stabilised according to claim 1.

* * * * *